US009208501B2

(12) United States Patent
Shae et al.

(10) Patent No.: US 9,208,501 B2
(45) Date of Patent: Dec. 8, 2015

(54) ELECTRONIC COMPUTING DEVICE, PERSONALIZED DATA RECOMMENDING METHOD THEREOF, AND NON-TRANSITORY MACHINE-READABLE MEDIUM THEREOF

(71) Applicant: Institute For Information Industry, Taipei (TW)

(72) Inventors: Zonyin Shae, Taipei (TW); Ko-Yang Wang, Taipei (TW); Meng-Jung Shih, Guishan Township (TW); Ting-Chieh Tu, New Taipei (TW); Ya-Hui Chan, Magong (TW); Ping-I Chen, Taipei (TW); Tai-Chun Wang, New Taipei (TW)

(73) Assignee: Institute For Information Industry, Taipei (TW)

( * ) Notice: Subject to any disclaimer, the term of this patent is extended or adjusted under 35 U.S.C. 154(b) by 193 days.

(21) Appl. No.: 14/094,359

(22) Filed: Dec. 2, 2013

(65) Prior Publication Data
US 2015/0100575 A1    Apr. 9, 2015

(30) Foreign Application Priority Data
Oct. 7, 2013  (TW) .............................. 102136193 A

(51) Int. Cl.
*G06F 17/30* (2006.01)
*G06Q 30/02* (2012.01)

(52) U.S. Cl.
CPC ..................................... *G06Q 30/02* (2013.01)

(58) Field of Classification Search
None
See application file for complete search history.

(56) References Cited

U.S. PATENT DOCUMENTS

| 7,630,916 | B2 | 12/2009 | Lind et al. | |
| 7,774,294 | B2 | 8/2010 | Aravamudan et al. | |
| 8,352,331 | B2 | 1/2013 | Dunning et al. | |
| 2009/0254971 | A1* | 10/2009 | Herz et al. | 726/1 |
| 2010/0228693 | A1* | 9/2010 | Dawson et al. | 706/12 |
| 2014/0025607 | A1* | 1/2014 | Wang et al. | 706/12 |

OTHER PUBLICATIONS

Kanungo et al., An Efficient k-Means Clustering Algorithm: Analysis and Implementation; IEEE Transactions on Pattern Analysis and Machine Intelligence, Vol. 24, No. 7, Jul. 2002; pp. 881-892.
Batagelj et al., An O(m) Algorithm for Cores Decomposition of Networks, Apr. 24, 2002 / Sep. 1, 2002, 9 pages.

(Continued)

*Primary Examiner* — Wilson Lee
(74) *Attorney, Agent, or Firm* — Skaar Ulbrich Macari, P.A.

(57) ABSTRACT

An electronic computing device, a personalized information providing method thereof, and a non-transitory machine-readable medium thereof are provided. The electronic computing device establishes a first and a second tree structure data according to a first data of a first user and a second data of a second user arranged in a period respectively by using an ontology construction algorithm, and calculates a similarity between the first and the second tree structure data by using a similarity evaluating algorithm, and then analyzes the similarity to subsume the first and the second tree structure data into a group by using a clustering algorithm. The electronic computing device determines difference between the first and the second tree structure data according to the group and generates recommending information corresponding to the first user which is arranged in the period according to the difference, and then enables a monitor to display the recommending information.

15 Claims, 11 Drawing Sheets

(56) References Cited

OTHER PUBLICATIONS

Hastie et al., Discriminant Adaptive Nearest Neighbor Classification, IEEE Transactions on Paitern Analysis and Machine Intelligence, vol. 18, No. 6, Jun. 1996, pp. 607-616.

Yang et al., Similarity Evaluation on Tree-structured Data, SIGMOD 2005 Jun. 14-16, 2005, Baltimore, Maryland, USA, 12 pages.

Cilibrasi et al., The Google Similarity Distance, IEEE Transactions on Knowledge and Data Engineering, vol. 19, No. 3, Mar. 2007, pp. 370-383.

\* cited by examiner

ELECTRONIC COMPUTING DEVICE, PERSONALIZED DATA RECOMMENDING METHOD THEREOF, AND NON-TRANSITORY MACHINE-READABLE MEDIUM THEREOF

PRIORITY

This application claims priority to Taiwan Patent Application No. 102136193, filed on Oct. 7, 2013, which is hereby incorporated herein by reference in its entirety.

FIELD

The present invention relates to an electronic computing device, a personalized information recommending method thereof and a non-transitory machine-readable medium thereof. More particularly, the electronic computing device of the present invention organizes the users' personal behavior data into tree structures, compares every two of the tree structures to generate a similarity therebetween, analyzes the similarity by using a clustering algorithm and deducts the users' personal data into groups, and then recommends information within a group having the highest correlations.

BACKGROUND

In this era which is experiencing rapid advancement of the information technologies, there are a lot of methods available for the user to acquire information, one of which is to recommend information to users by a processing system according to the correlations of data. In terms of the recommending method currently adopted, usually users' behavior data is represented in a matrix format and then recommend information to the users according to the evaluation results.

Specifically, assume that five kinds of commodity items A, B, C, D and E are sold in a supermarket. In this case, the users' behavior data is commodity items purchased. For example, commodity items and accumulated amounts purchased by a consumer I in this supermarket are: 5 pieces of item A, 3 pieces of item C and 1 piece of item E, so the purchase data corresponding to the consumer I may be represented as {A, B, C, D, E}={5, 0, 3, 0, 1}. Similarly, assume that commodity items and accumulated amounts purchased by another consumer II in this supermarket are represented as {A, B, C, D, E}={4, 5, 0, 0, 1}. Then for the consumer I, the item B is not purchased by the consumer I but has been purchased by the consumer II. Therefore, the supermarket may recommend the item B to the consumer I as a recommended purchase item for the consumer I. On the other hand, for the consumer II, the item C is not purchased by the consumer II but has been purchased by the consumer I, so the supermarket may recommend the item C to the consumer II as a recommended purchase item for the consumer II.

However, this recommending method is unable to calculate information correlations between consumers if there are more than two consumers. This causes consumers purchasing different commodities to be recommended to each other and leads to significant degradation in effectiveness of the recommended information. Furthermore, the information obtained through this recommending method is only a result of accumulating the consumer data and, instead of distinguishing the consumer information by time, this recommending method evaluates all pieces of consumer information simultaneously. Even when a great change takes place in a consumer' life, this recommending method is unable to know the great change through analysis.

Accordingly, an urgent need exists in the art to provide a solution that can improve the information correlations among the users and information effectiveness among the pieces of recommended information and that can take into account the differences in different time periods of the users' behavior information (e.g., transaction data, activity data, purchased items or the like).

SUMMARY

An objective of certain embodiments of the present invention is to provide an electronic computing device, a personalized information recommending method thereof and a non-transitory machine-readable medium thereof which makes correlations between pieces of users' personal information accurately and further provides recommending information with time variations to improve the effectiveness of the recommended data. Thereby, a good recommending effect can be achieved.

To achieve the aforesaid objective, certain embodiments of the present invention disclose an electronic computing device for providing a personalized information recommendation. The electronic computing device comprises an input/output interface, a storage and a processor. The input/output interface is configured to receive a first behavior data of a first user and a second behavior data of a second user. The first behavior data and the second behavior data are arranged in a first period. The storage electrically connected to the input/output interface is configured to store the first behavior data and the second behavior data.

The processor electrically connected to the storage is configured to execute the following operations: retrieving the first behavior data and the second behavior data from the storage; establishing a first tree structure data and a second tree structure data according to the first behavior data and the second behavior data respectively by using an ontology construction algorithm; calculating a first similarity between the first tree structure data and the second tree structure data by using a similarity evaluation algorithm; analyzing the first similarity to subsume the first tree structure data and the second tree structure data into a first group by using a clustering algorithm; determining a piece of first difference information between the first tree structure data and the second tree structure data of the first user according to the first group; and generating a piece of first recommending information in the first period corresponding to the first user according to the piece of first difference information and enabling a first monitor to display the piece of first recommending information.

To achieve the aforesaid objective, certain embodiments of the present invention further disclose a personalized information recommending method for use in an electronic computing device. The electronic computing device comprises an input/output interface, a storage and a processor. The personalized information recommending method comprises the following steps of: enabling the input/output interface to receive a first behavior data of a first user and a second behavior data of a second user, wherein the first behavior data and the second behavior data are arranged in a first period; enabling the storage to store the first behavior data and the second behavior data; enabling the processor to retrieve the first behavior data and the second behavior data from the storage; enabling the processor to establish a first tree structure data and a second tree structure data according to the first behavior data and the second behavior data respectively by using an ontology construction algorithm; enabling the processor to calculate a first similarity between the first tree structure data and the second tree structure data by using a similarity evaluation algorithm; enabling the processor to analyze the first similarity to subsume the first tree structure data and the second tree structure data into a first group by using a clustering algorithm; enabling the processor to determine a piece of first difference information between the first tree structure data and the second tree structure data of the first user according to the first group; and enabling the processor to generate a piece of first recommending information in the first period corresponding to the first user according to the piece of first difference information, and enabling a first monitor to display the piece of first recommending information.

The present invention further discloses, in certain embodiments, a non-transitory machine-readable medium comprising a plurality of codes. When the plurality of codes are loaded into an electronic computing device, the codes comprised in the non-transitory machine-readable medium will be executed by the electronic computing device to accomplish a personalized information recommending method.

The codes comprise: a code A for enabling the electronic computing device to receive a first behavior data of a first user and a second behavior data of a second user, wherein the first behavior data and the second behavior data are arranged in a first period; a code B for enabling the electronic computing device to store the first behavior data and the second behavior data; a code C for enabling the electronic computing device to establish a first tree structure data and a second tree structure data according to the first behavior data and the second behavior data respectively by using an ontology construction algorithm; a code D for enabling the electronic computing device to calculate a first similarity between the first tree structure data and the second tree structure data by using a similarity evaluation algorithm; a code E for enabling the electronic computing device to analyze the first similarity to subsume the first tree structure data and the second tree structure data into a first group by using a clustering algorithm; a code F for enabling the electronic computing device to determine a piece of first difference information between the first tree structure data and the second tree structure data of the first user according to the first group; and a code G for enabling the electronic computing device to generate a piece of first recommending information in the first period corresponding to the first user according to the piece of first difference information and enabling a first monitor to display the piece of first recommending information.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to example embodiments thereof. However, these example embodiments are not intended to limit the present invention to any specific examples, embodiments, environment, applications or particular implementations described in these embodiments. Therefore, description of these example embodiments is only for purpose of illustration rather than to limit the present invention. It should be appreciated that, in the following embodiments and the attached drawings, elements unrelated to the present invention are omitted from depiction.

Figure 1A:
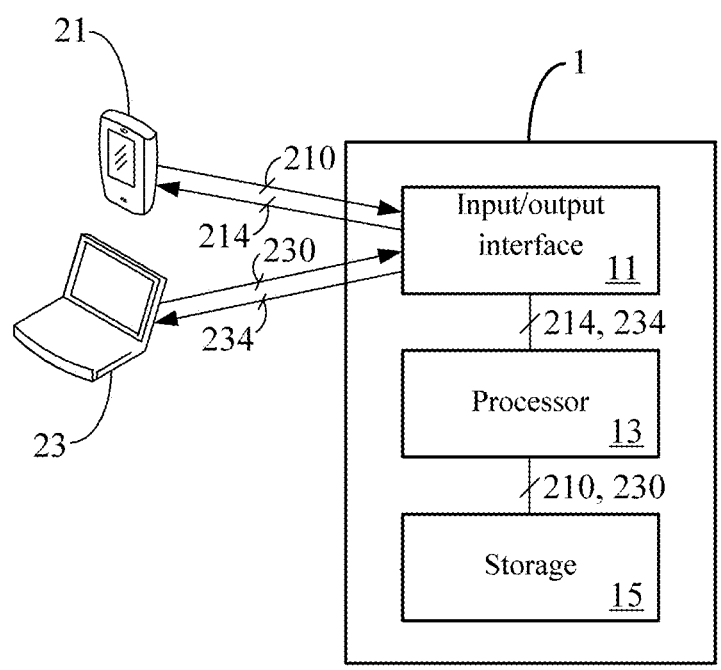
FIG. 1A is functional block diagram of an electronic computing device according to a first embodiment of the present invention.

A first embodiment of the present invention will be described with reference to FIG. 1A, FIG. 1B and FIG. 1C together. FIG. 1A is a functional block diagram of an electronic computing device 1, FIG. 1B is a schematic view illustrating users' tree structure data, and FIG. 1C is a schematic view of a group.

The electronic computing device 1 of the present invention is used to provide a personalized information recommendation. The personalized information recommendation provided by the electronic computing device 1 may be a travel itinerary recommendation, a purchase item recommendation, and the like. The electronic computing device 1 is a web server or any other similar computing device, and comprises an input/output interface 11, a processor 13 and a storage 15. The processor 13 is electrically connected to the input/output interface 11 and the storage 15 respectively, and the storage could be a database or a buffer or the like. How the present invention provides the information recommendation to a user will be described hereinbelow.

Take a case where a travel itinerary is provided as the personalized information recommendation as an example. An international seminar is to be held in a college in Taiwan for five days, and a Japanese III (a first user) and a Japanese IV (a second user) are going to attend the seminar. A set of itinerary tree structure data established for people from different nationalities is pre-stored in the storage 15 of the electronic computing device 1. For example, an American tree structure behavior data is established according to preferences of Americans, and a Japanese tree structure behavior data may also be established according to preferences of Japanese. The contents of these tree structure behavior data are all established in an organized way according to preferred itineraries of people from different nationalities.

Figure 1B:
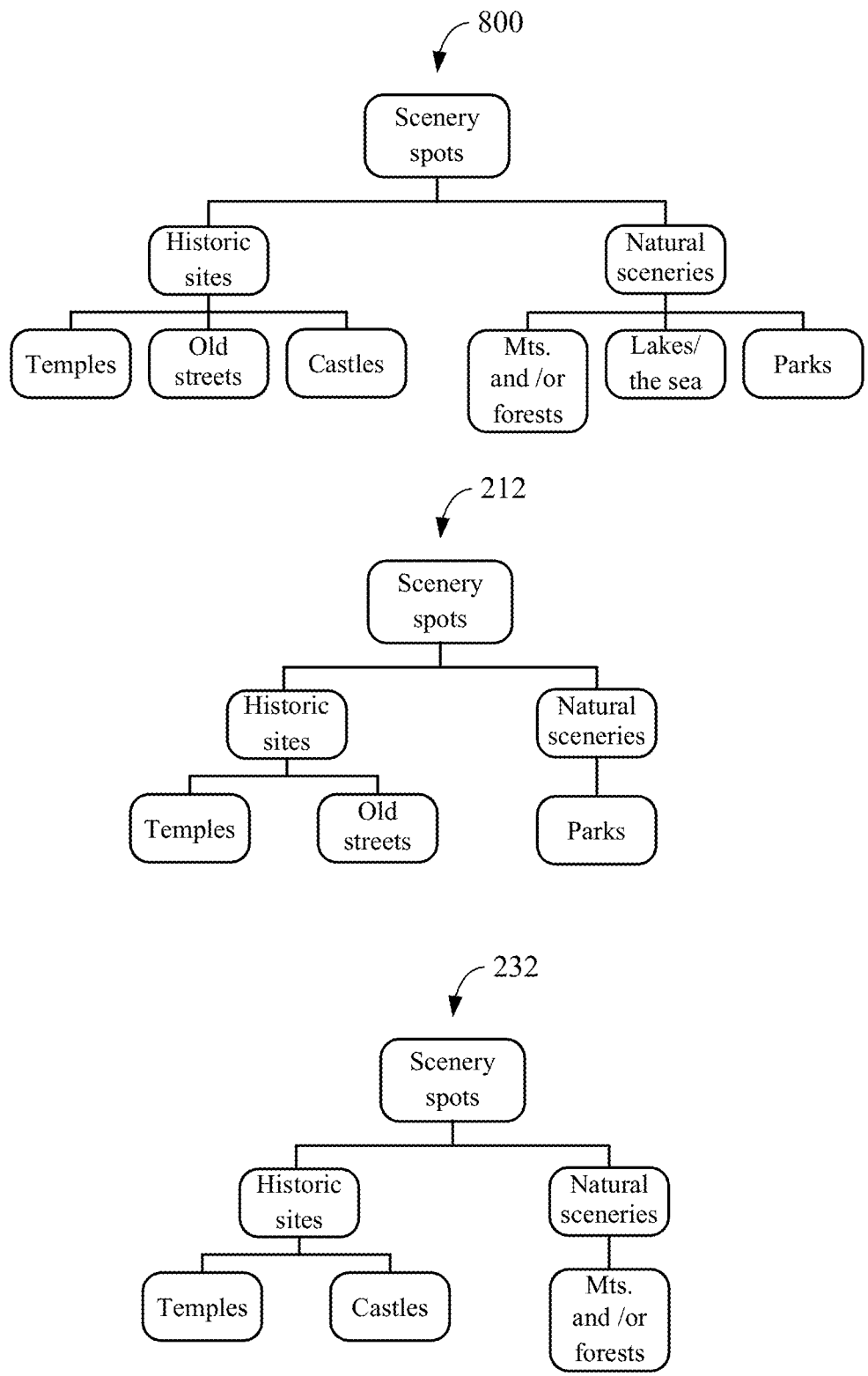
FIG. 1B is a schematic view illustrating a general ontology tree and users' tree structure data according to the first embodiment of the present invention.
Figure 1C:
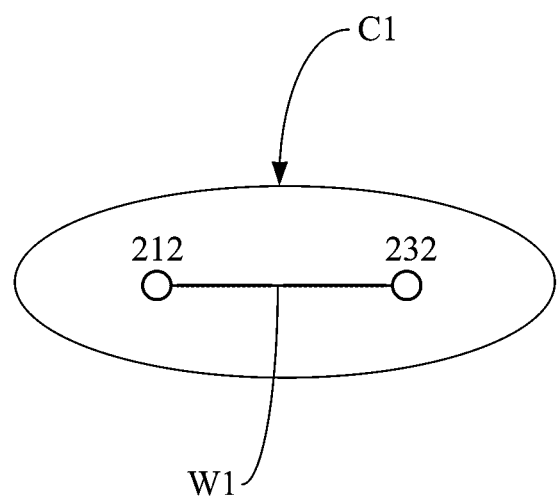
FIG. 1C is a schematic view of a group according to the first embodiment of the present invention.

For example, as shown in FIG. 1B, a general ontology tree 800 related to the preferences of the Japanese is pre-stored in the storage 15. The root may be "scenery spots", branches of the "scenery spots" comprise "historic sites" and "natural sceneries", branches of the "historic sites" further comprise "temples", "old streets" and "castles", branches of the "natural sceneries" comprise "mountains and/or forests", "the sea"

and "parks", and so on. Since the users III and IV are intended to join the same event (i.e., attending the international seminar), this event becomes a common basic point of the users III and IV, and the period with the event is a first period. On the basis of this, the electronic computing device 1 of the present invention further provides recommending information to the users III and IV in an interactive way.

Assume that the user III plans to visit the "Xingtian Temple", the "Danshui Old Street" and the "Taroko National Park" (These are very famous hot spots in Taiwan.) during the five days of the seminar in addition to the preset seminar itinerary. The user III inputs the aforesaid itinerary data into his own smart phone 21 as a first behavior data. In this embodiment, the first behavior data is a first itinerary data 210. The user IV plans to visit the "Longshan Temple", the "Xinshe Castle" and the "Yangming Mountain". The user IV transmits the aforesaid itinerary to the electronic computing device 1 as a second behavior data via a personal computer 23 and a web interface built in the electronic computing device 1. In this embodiment, the second behavior data is a second itinerary data 230.

Here, the electronic computing device 1 is a web server, and the web interface is embodied as a calendar interface. It should be appreciated that, since the behavior data is exemplified as the itinerary data in this embodiment, the recommending information of this embodiment is also exemplified as a recommending itinerary.

The electronic computing device 1 receives the second itinerary data 230 of the user IV via the input/output interface 11 (e.g., a network interface). Then, the processor 13 can retrieve the first itinerary data 210 of the user III from the smart phone 21 via the input/output interface 11, or the smart phone 21 updates the first itinerary data 210 into the electronic computing device 1 via the input/output interface 11 when it detects that the user III has input his first itinerary data 210 into the smart phone 21. The electronic computing device 1 or the processor 13 stores the first itinerary data 210 and the second itinerary data 230 into the storage 15.

The processor 13 retrieves the first itinerary data 210 and the second itinerary data 230 from the storage 15, and organizes the first itinerary data 210 and the second itinerary data 230 into a first tree structure data 212 and a second tree structure data 232 respectively according to the general ontology tree 800 by using an ontology construction algorithm.

In detail, firstly, the processor 13 determines correlations between each key word of the first and the second itinerary data 210, 230 and each node of the general ontology tree 800, for example, by using a normalized Google distance (NGD) algorithm as follows:

$$NGD(x, y) = \frac{\max\{\log f(x), \log f(y)\} - \log f(x, y)}{\log N - \min\{\log f(x), \log f(y)\}} \quad (1)$$

where f(x) represents the number of search results for a key word x which are obtained by using the Google search engine, f(y) represents the number of search results for a key word y which are obtained by using the Google search engine, f(x, y) represents a number of search results for both the key words x and y which are obtained by using the Google search engine, and N is a total web number contained in the Google search engine.

For example, when the first tree structure data 212 of the user III is established, the key word "Xingtian Temple" in the first itinerary data 210 is taken as x, and the root node "scenery spots" of the general ontology tree 800 is substituted into the Equation 1 as y. Then, the correlation between the "Xingtian Temple" and the "scenery spots" is determined. Thereafter, the "Xingtian Temple" and other nodes of the general ontology tree 800 are substituted into the Equation 1 one by one. Finally, the electronic computing device 1 determines which node of the general ontology tree 800 has the highest correlation with the "Xingtian Temple", and subsumes the "Xingtian Temple" into the node having the highest correlation. In this embodiment, the "Xingtian Temple" is subsumed into the "temples" node of the general ontology tree 800, e.g., the "temples" node shown in the first tree structure data 212 in FIG. 1B.

Then, the "Danshui Old Street" and the "Taroko National Park" in the first itinerary data 210 are subsumed into the "old streets" and the "parks" respectively in the same way. Finally, the first tree structure data 212 is completed. The second street structure data 232 of the user IV is also established in the same way. Detailed calculations of the ontology construction algorithm are accomplished, for example, in the way described in the journal "The Google Similarity Distance" (Rudi L. Cilibrasi and Paul M.B. Vit'anyi. 2007. IEEE TRANSACTIONS ON KNOWLEDGE AND DATA ENGINEERING VOL. 19, NO 3, MARCH 2007, 370-383). How to establish a tree structure data can be appreciated by those skilled in the art upon reviewing this journal.

After the first tree structure data 212 and the second tree structure data 232 are established, the processor 13 then calculates a first similarity W1 between the first tree structure data 212 and the second tree structure data 232 by using a similarity evaluation algorithm.

The similarity evaluation algorithm is, for example, an algorithm described in section 2 of the paper "Similarity Evaluation on Tree-structured Data" (Rui Yang, Panos Kalnis and Anthony K. H. Tung. SG: School of Computing National University of Singapore). How to calculate the first similarity W1 between the first tree structure data 212 and the second tree structure data 232 of the present invention can be appreciated by those skilled in the art based upon reviewing this paper. It should be appreciated that, the similarity is a weight value, and the first similarity W1 is, for example, 0.9.

Next, the processor 13 analyzes the similarity between the data to cluster the tree structure data by using a clustering algorithm, e.g., a K-core analysis algorithm, a K-nearest neighbor (KNN) clustering algorithm or a K-means clustering algorithm.

For example, this embodiment analyzes the first similarity W1 and subsumes the first tree structure data 212 and the second tree structure data 232 into a first core group C1 by using the K-core analysis algorithm, as shown in FIG. 1C. It should be appreciated that, the K-core analysis algorithm analyzes the first similarity W1 by substituting the nodes (i.e., the first tree structure data 212 and the second tree structure data 232) and the connection (i.e., the first similarity W1) into the K-core analysis algorithm.

The K-core analysis algorithm is, for example, an algorithm described in the paper "An O(m) Algorithm for Cores Decomposition of Networks" (Vladimir Batagelj and Matjaž Zaveršnik. 2002. SI: Department of Mathematics, University of Ljubljana, Slovenia). How to analyze the first similarity W1 to subsume the first tree structure data 212 and the second tree structure data 232 into a first core group C1 can be appreciated by those skilled in the art upon reviewing this paper.

In addition, the K-nearest neighbor clustering algorithm is, for example, an algorithm described in the paper "Discriminant Adaptive Nearest Neighbor Classification" (Trevor Hastie and Rolbert Tibshirani. 1996. US: IEEE TRANSACTIONS ON PATTERN ANALYSIS AND MACHINE INTELLIGENCE).

The K-means clustering algorithm is, for example, an algorithm described in the paper "An Efficient k-Means Clustering Algorithm: Analysis and Implementation" (Tapas Kanungo, Senior Member, IEEE, David M. Mount, Member, IEEE, Nathan S. Netanyahu, Member, IEEE, Christine D. Piatko, Ruth Silverman, and Angela Y. Wu, Senior Member, IEEE. 2002. FR: IEEE TRANSACTIONS ON PATTERN ANALYSIS AND MACHINE INTELLIGENCE). How to analyze the similarity to subsume the tree structure data can be appreciated by those skilled in the art upon reviewing the aforesaid papers describing the K-nearest neighbor clustering algorithm and the K-means clustering algorithm, and thus will not be further described herein.

Thereafter, the processor 13 determines a piece of difference information according to the determination result that the first tree structure data 212 and the second tree structure data 232 are subsumed into the first core group C1. For the first structure data 212 of the user III, a piece of first difference information determined between the first tree structure data 212 and the second tree structure data 232 is the nodes comprised in the second tree structure data 232 but not included in the first tree structure data 212, i.e., the "castles" and the "mountains and/or forests".

Subsequently, the processor 13 generates a first recommending itinerary 214 according to the piece of first difference information, i.e., the "castles" and the "mountains and forests" of the second tree structure data 232, which correspond to the "Xinshe Castle" and the "Yangming Mountain" of the second itinerary data 230. For example, the first recommending itinerary 214 is "recommending that the user III goes to visit the Xinshe Castle and the Yangming Mountain during the 5 days of the seminar". Then the processor 13 transmits the first recommending itinerary 214 to the smart phone 21 of the user III so that the first recommending itinerary 214 is displayed by a monitor of the smart phone 21.

In other embodiments, the processor 13 further generates a second recommending itinerary 234 for the user IV. In detail, the processor 13 determines a piece of second difference information between the second tree structure data 232 and the first tree structure data 212 according to the determination result that the first tree structure data 212 and the second tree structure data 232 are subsumed into the first core group C1. In other words, the piece of second difference information is the nodes "old streets" and "parks" comprised in the first tree structure data 212 but not comprised in the second tree structure data 232.

Subsequently, the processor 13 generates a second recommending itinerary 234 according to the piece of second difference information, i.e., the "old streets" and the "parks" of the second tree structure data 232, which correspond to the "Danshui Old Street" and the "Taroko National Park" of the second itinerary data 230. For example, the second recommending itinerary 234 is "recommending that the user IV goes to visit the Danshui Old Street and the Taroko National Park during the 5 days of the seminar". Then the processor 13 transmits the second recommending itinerary 234 to the personal computer 23 of the user IV so that the second recommending itinerary 234 is displayed by a monitor of the personal computer 23.

Figure 2A:
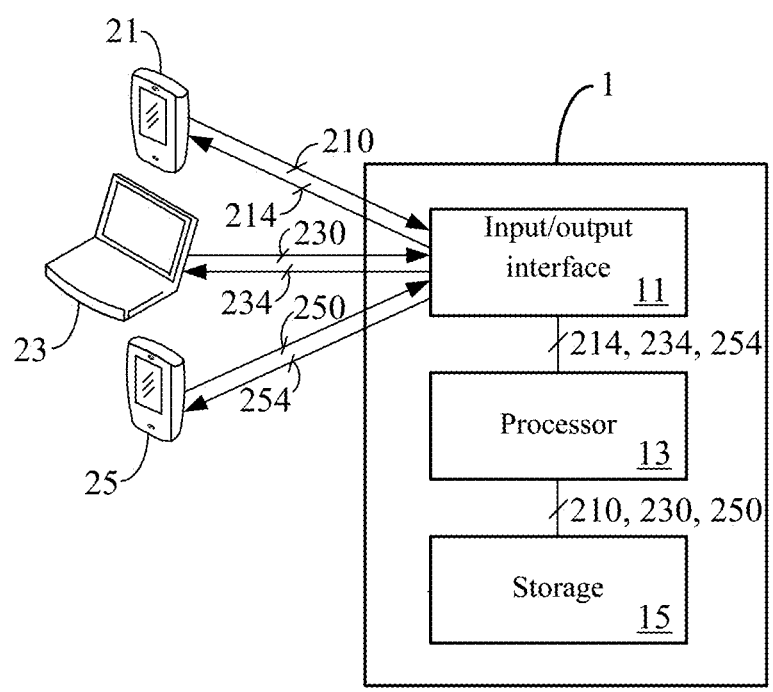
FIG. 2A is a functional block diagram of an electronic computing device according to a second embodiment of the present invention.
Figure 2B:
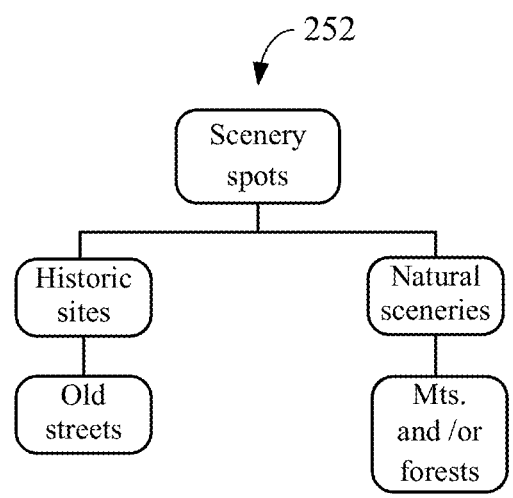
FIG. 2B is a schematic view of a user's tree structure data according to the second embodiment of the present invention.
Figure 2C:
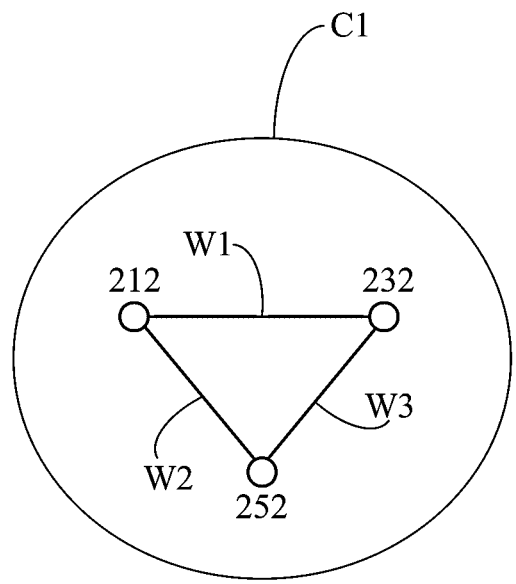
FIG. 2C is a schematic view of a group according to the second embodiment of the present invention.

A second embodiment of the present invention will be described with reference to FIG. 1B, FIG. 2A, FIG. 2B and FIG. 2C together. FIG. 2A is a functional block diagram of the electronic computing device 1, FIG. 2B is a schematic view of a user's tree structure data, and FIG. 2C is a schematic view of a group according to this embodiment.

Elements comprised in the electronic computing device 1 of the second embodiment are the same as those comprised in the electronic computing device 1 of the first embodiment and can also execute all the operations that can be executed by the electronic computing device 1 of the first embodiment. It should be appreciated that, this embodiment is different from the first embodiment in that, in this embodiment, there are three users in total to attend the 5-day seminar, including another user V (also a Japanese, i.e., a third user) in addition to the users III and IV mentioned in the first embodiment. The data/information associated with the users III and IV still remains the same as that in the first embodiment.

The ontology construction algorithm, the similarity evaluation algorithm and the clustering algorithm mentioned in the first embodiment are also adopted in this embodiment. It should be appreciated that, the K-core analysis algorithm is still taken as an example of the clustering algorithm in this embodiment, but the present invention is not limited thereto.

In the second embodiment, the user V also attends the 5-day international seminar held in the college in Taiwan and plans to visit the "Neiwan Old Street" and the "Xiangshan Mountain" during the 5 days. The user V inputs the planned itinerary into his smart phone 25 as a third itinerary data 250.

Likewise, the electronic computing device 1 receives the third itinerary data 250 from the smart phone 25 via the input/output interface 11 in the way set forth in the first embodiment, and stores the third itinerary data 250 into the storage 15. Then, the processor 13 retrieves the third itinerary data 250 from the storage 15 and establishes a third tree structure data 252 as shown in FIG. 2B according to the general ontology tree 800 by using the ontology construction algorithm.

Subsequently, the processor 13 calculates a second similarity W2 (e.g., 0.8) between the first tree structure data 212 and the third tree structure data 252 and a third similarity W3 (e.g., 0.7) between the second tree structure data 232 and the third tree structure data 252 by using the similarity evaluation algorithm.

Similar to the first embodiment, the processor 13 analyzes the first similarity W1, the second similarity W2 and the third similarity W3 and further subsumes the first tree structure data 212, the second tree structure data 232 and the third tree structure data 252 together into the first core group C1 by using the K-core analysis algorithm. This means that the first tree structure data 212, the second tree structure data 232 and the third tree structure data 252 have high correlations therebetween. In this case, the first core group C1 is as shown in FIG. 2C.

Therefore, in a same group in which data have correlations therebetween, a difference data between each user's itinerary data and others' itinerary data is analyzed in the perspective of the user, and a recommending itinerary is further provided to the user according to the difference data. Specifically, in this embodiment, the users III, IV and V belong to the same group. For the user III, the itinerary to be recommended to the user III is an itinerary comprised in the plans of the users IV and V but not comprised in the plan of the user III during the seminar, i.e., the nodes which are comprised in the second tree structure data 232 and the third tree structure data 252 but not comprised in the first tree structure data 212. In other words, the recommending itinerary is the piece of first difference information, i.e., the "castles" and the "mountains and/or forests".

Furthermore, the difference information between the first tree structure data 212 and the second tree structure data 232 is the "castles" and the "mountains and/or forests", and the difference information between the first tree structure data 212 and the third tree structure data 252 is the "mountains and/or forests". In other words, the first difference information comprises two difference words, which are the "castles" and the "mountains and/or forests". The word "castles" appears once, and the word "mountains and/or forests" appears twice. Thus, the processor 13 further accumulates the number of appearances of each of the words "castles" and "mountains and/or forests" and generates the first recommending itinerary 214 with priority according to the difference word "mountains and/or forests" of which the number of appearances is the largest.

In other embodiments, the first recommending itinerary 214 may also be generated according to the piece of first difference information by using a threshold. In detail, the threshold is an appearance ratio threshold (e.g., 0.4) of a word. For example, the data contents comprised in the second tree structure data 232 and the third tree structure data 252 but not comprised in the first tree structure data 212 of the user III are the "castles" and the "mountains and/or forests". The numbers of appearances of the words "castles" and "mountains and/or forests" are respectively 1 and 2, so the appearance ratios thereof are respectively 0.33 and 0.67. Then, the processor 13 generates the first recommending itinerary 214 according to the node of the tree structure data of which the appearance ratio is higher than the threshold of 0.4 (i.e., the "mountains and/or forests").

The first recommending itinerary 214 is generated as follows. The "Yangming Mountain" of the second itinerary data 230 and the "Xiangshan Mountain" of the third itinerary data 250 which respectively correspond to the "mountains and/or forests" of the second tree structure data 232 and the third tree structure data 252 are obtained. Then, the processor 13 transmits the first recommending itinerary 214 of "recommending that the user III goes to the Yangming Mountain and the Xiangshan Mountain during the 5 days of the seminar" to the smart phone 21 of the user III via the input/output interface 11. Then, the first recommending itinerary 214 is displayed by the monitor of the smart phone 21.

Similar to the generation method and the transmission procedure of the first recommending itinerary 214, the processor firstly generates the piece of second difference information between the second tree structure data 232 and the first and the third tree structure data 212, 252, and a piece of third difference information between the third tree structure data 252 and the first and the second tree structure data 212, 232. Then the processor generates a second recommending itinerary 234 and a third recommending itinerary 254 according to the piece of second difference information and the piece of third difference information.

The second recommending itinerary 234 of "recommending that the user IV goes to the Danshui Old Street and the Neiwan Old Street during the 5 days of the seminar" and the third recommending itinerary 254 of "recommending that the user V goes to the Xingtian Temple and the Longshan Temple during the 5 days of the seminar" respectively are also received by the personal computer 23 of the user IV and the smart phone 25 of the user V via the input/output interface 11 from the electronic computing device 1 or the processor 13. Then, the second recommending itinerary 234 and the third recommending itinerary 254 are displayed by a monitor of the personal computer 23 and a monitor of the smart phone 25 respectively.

As can be known, when there are three (or more) users, the numbers of appearances of difference words and one, two or more of the difference words having the largest number of appearances can be used as the difference information in the itinerary contents recommended to each other. Or alternatively, which difference words are used as the difference information is determined by setting a threshold, and then a recommending itinerary is provided accordingly. In this way, a recommending itinerary with redundant and messy contents resulted from too many difference words can be avoided.

Figure 3A:
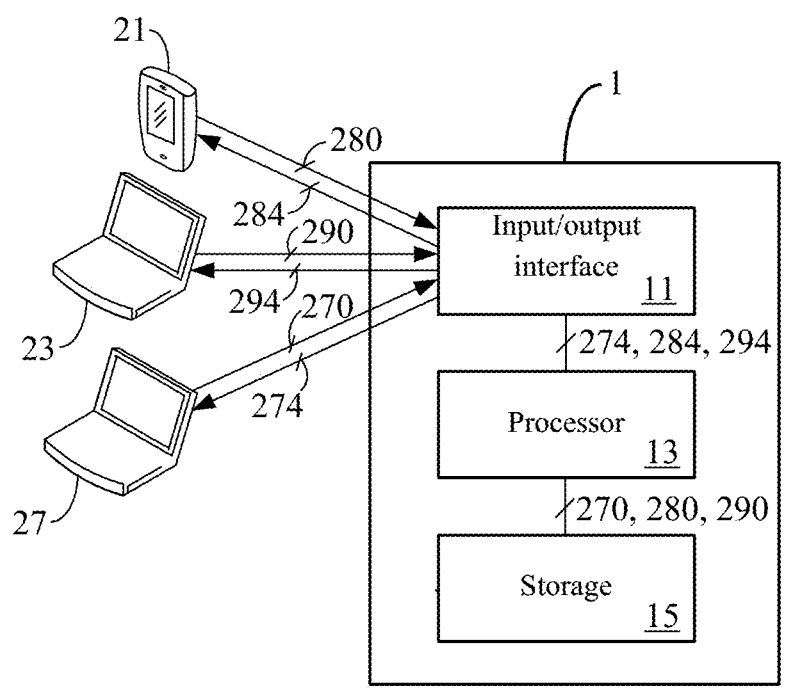
FIG. 3A is a functional block diagram of an electronic computing device according to a third embodiment of the present invention.
Figure 3B:
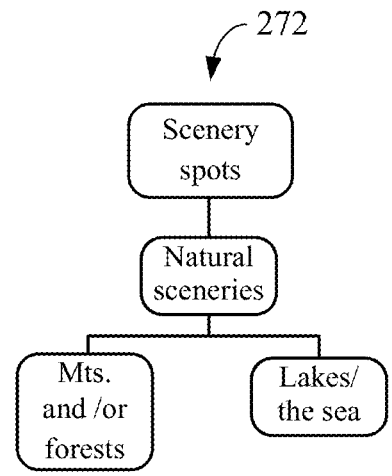
FIG. 3B is a schematic view of users' tree structure data according to the third embodiment of the present invention.
Figure 3B:
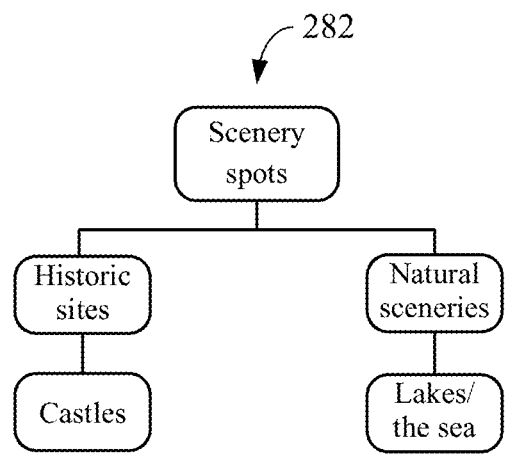
Figure 3B:
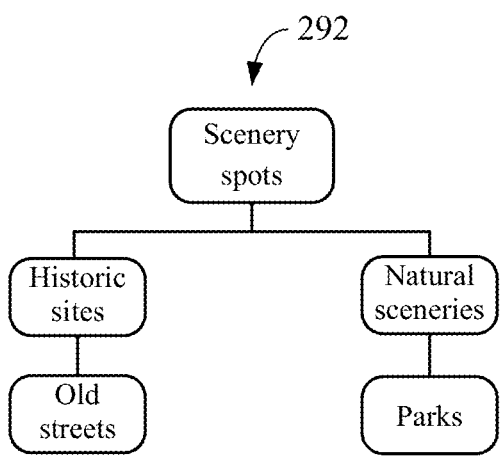
Figure 3C:
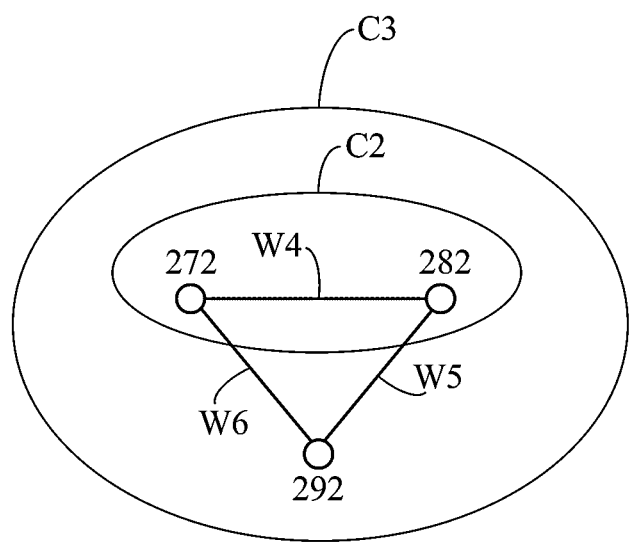
FIG. 3C is a schematic view of a group according to the third embodiment of the present invention.

A third embodiment of the present invention will be described with reference to FIG. 1B, FIG. 3A, FIG. 3B and FIG. 3C together. FIG. 3A is a functional block diagram of the electronic computing device 1, FIG. 3B is schematic views of users' tree structure data, and FIG. 3C is a schematic view of a group according to this embodiment.

Elements comprised in the electronic computing device 1 of the third embodiment are the same as those comprised in the electronic computing device 1 of the first embodiment and can execute all the operations that can be executed by the electronic computing device 1 of the first embodiment. It should be appreciated that, this embodiment is different from the first embodiment in that, there are three users in this embodiment, including another user VI (also a Japanese, i.e., a fourth user) in addition to the users III and IV mentioned in the first embodiment. The data/information related to the users III and IV is the same as that in the first embodiment.

Furthermore, a second period for the users to schedule an itinerary in this embodiment is different from the first period described in the first and the second embodiments. The ontology construction algorithm, the similarity evaluation algorithm and the clustering algorithm mentioned in the first embodiment are also adopted in this embodiment. It should be appreciated that, the K-core analysis algorithm is still taken as an example of the clustering algorithm in this embodiment, but the present invention is not limited thereto.

In the second period (e.g., the National Day holiday), the user VI plans to visit the Riyuetan Pool and the Ali Mountain, so a fourth itinerary data 270 of the user VI is the "Riyuetan Pool" and the "Ali Mountain". The user III plans to visit the "Anping Castle" and the "Tainan Gold Coast", so a fifth itinerary data 280 of the user III is "Anping Castle" and the "Tainan Gold Coast". The user IV plans to visit the "Lugang Old Street" and the "Taichung Metropolitan Park", so a sixth itinerary data 290 of the user IV is "Lugang Old Street" and the "Taichung Metropolitan Park".

Then, a personal computer 27 of the user VI, the smart phone 21 of the user III and the personal computer 23 of the user VI transmit the fourth itinerary data 270, the fifth itinerary data 280 and the sixth itinerary data 290 respectively to the electronic computing device 1 via the input/output interface 11. The electronic computing device 1 or the processor 13 stores the fourth itinerary data 270, the fifth itinerary data 280 and the sixth itinerary data 290 into the storage 15.

Thereafter, the processor 13 retrieves the fourth itinerary data 270, the fifth itinerary data 280 and the sixth itinerary data 290 from the storage 15, and organizes the fourth itinerary data 270, the fifth itinerary data 280 and the sixth itinerary data 290 into a fourth tree structure data 272, a fifth tree structure data 282 and a sixth tree structure data 292 according to the general ontology tree 800 by using the ontology construction algorithm, as shown in FIG. 3B.

Then, the processor 13 calculates a fourth similarity W4 (e.g., 0.8) between the fourth tree structure data 272 and the fifth tree structure data 282, a fifth similarity W5 (e.g., 0.5) between the fifth tree structure data 282 and the sixth tree structure data 292, and a sixth similarity W6 (e.g., 0.4) between the sixth tree structure data 292 and the fourth tree structure data 272.

Furthermore, the processor 13 analyzes the fourth similarity W4, the fifth similarity W5 and the sixth similarity W6 to subsume the fourth tree structure data 272 and the fifth tree structure data 282 into a second core group C2 and subsume the fourth tree structure data 272, the fifth tree structure data 282 and the sixth tree structure data 292 into a third core group C3 by using the K-core analysis algorithm. An internal data correlation of the second core group C2 is higher than an internal data correlation of the third core group C3, as shown in FIG. 3C.

For the user III, in terms of the data of the second core group C2 and the third core group C3, the internal data correlation of the second core group C2 is higher than the internal data correlation of the third core group C3. Therefore, the electronic computing device 1 recommends only the fourth tree structure data 272 of the user VI within the second core group C2 and related contents of the fourth itinerary data 270 to the user III.

In detail, the processor 13 determines a piece of fourth difference information between the fifth tree structure data 282 and the fourth tree structure data 272 which is the nodes comprised in the fourth tree structure data 272 but not included in the fifth tree structure data 282 (i.e., the node "mountains and/or forests" of the fourth tree structure data 272) according to the second core group C2. Then a fourth recommending itinerary 274 of "suggesting that the user III goes to the Ali Mountain during the National Day holiday" corresponding to the user III could be arranged in the second period is generated according to the piece of fourth difference information which corresponds to the "Ali Mountain" of the fourth itinerary data. Then the processor 13 transmits the fourth recommending itinerary 274 to the smart phone 21 of the user III via the input/output interface so that the fourth recommending itinerary 274 is displayed by the first monitor of the smart phone 21.

Similarly, the processor 13 determines a piece of fifth difference information between the fourth tree structure data 272 and the fifth tree structure data 282 which is the nodes comprised in the fifth tree structure data 282 but not included in the fourth tree structure data 272 according to the second core group C2, and generates a fifth recommending itinerary 284 for the user VI accordingly. The processor 13 transmits the fifth recommending itinerary 284 to the personal computer 27 of the user VI via the input/output interface 11.

It should be appreciated that, since the sixth tree structure data 292 of the user IV is not in the second core group C2 but in the third core group C3, the processor 13 generates a sixth recommending itinerary 294 according to a piece of sixth difference information between the sixth tree structure data 292 and the fourth and the fifth tree structure data 272, 282 which is the nodes comprised in the fourth and the fifth tree structure data 272, 282 but not included in the sixth tree structure data 292. The fifth recommending itinerary 284 and the sixth recommending itinerary 294 are generated in the same way as that of other recommending itineraries, so this will not be further described herein.

In addition, when there are three (or more) users, the numbers of appearances of difference words and one, two or more of the difference words having the largest number of appearances can be used as the difference information in the itinerary contents recommended to each other. Or alternatively, which difference words are used as the difference information is determined by setting a threshold, and then a piece of recommending information is provided accordingly. In this way, a piece of recommending information with redundant and messy contents resulted from too many difference words can be avoided. The implementations are as described in the second embodiment.

As can be known from the above descriptions, in the first period of the first embodiment, the itinerary recommended to the user III is related to the second itinerary data 230 planned by the user IV. However, once the time is changed, for example, in the second period of the third embodiment, the itinerary recommended to the user III is related to the fourth itinerary data 270 planned by the user VI but not related to the sixth itinerary data 290 planned by the user IV. In other words, the present invention can reflect the close correlation between the recommended itinerary and the time variations.

Therefore, itinerary recommendations provided by the present invention for different periods are independent from each other, and thus personalized demands in different time periods can be well satisfied. In other words, the ideals and the life style of the user change with time constantly, and if an itinerary recommendation is provided to the user by accumulating the number of the users' itinerary data as in the prior art, the factor of time cannot be reflected accurately. What's worse, the current data may be reflected to a less extent because of too many accumulated data that the user has.

Figure 4:
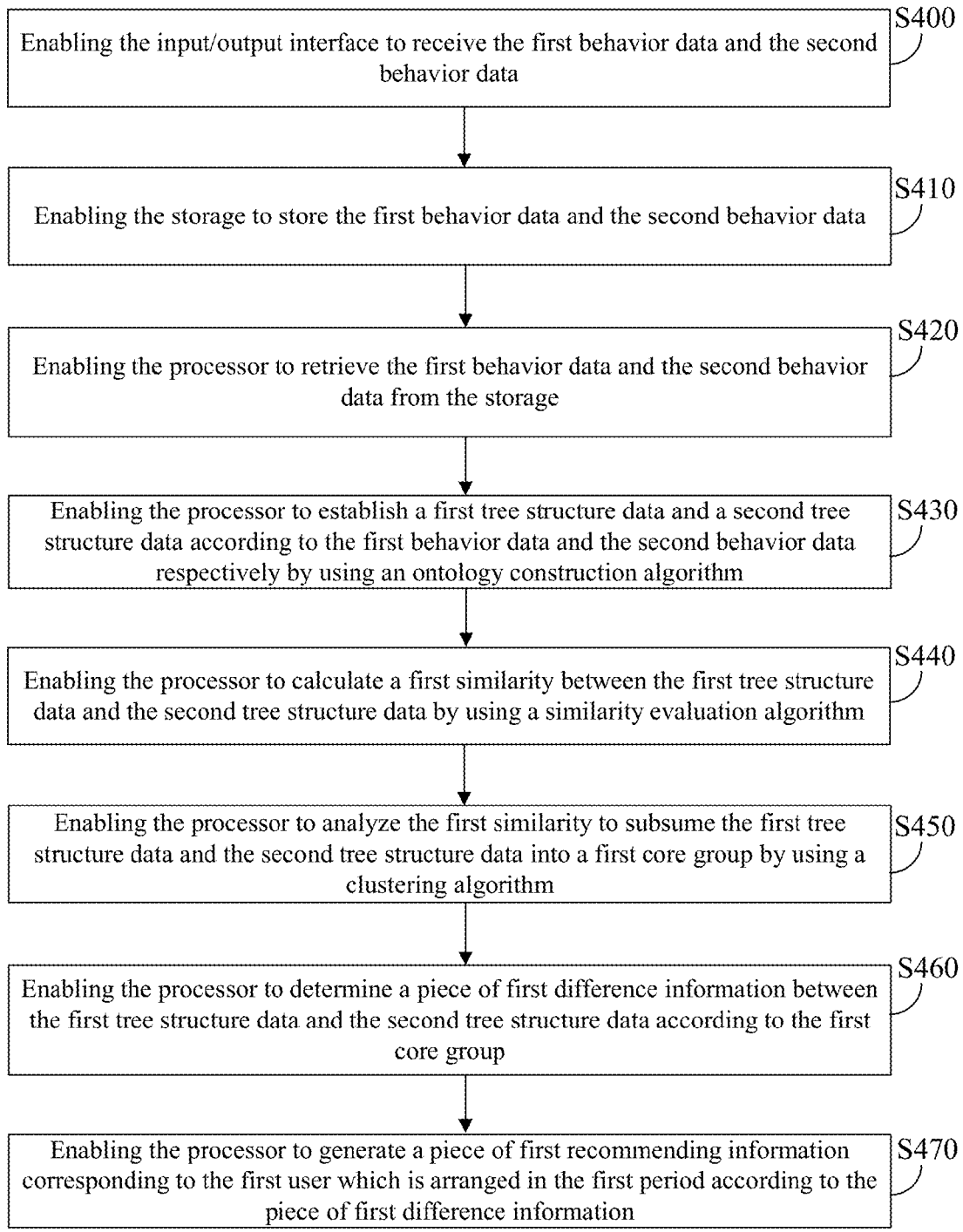
FIG. 4 is a flowchart diagram of a personalized information recommending method according to a fourth embodiment and a fifth embodiment of the present invention.

A fourth embodiment of the present invention is a personalized information recommending method, a flowchart diagram of which is shown in FIG. 4. This personalized information recommending method is adapted for an electronic computing device (e.g., the electronic computing device 1 described in the first embodiment). Users as well as data/information and hardware equipment used by the users in this embodiment are the same as those in the first embodiment. That is, the users in this embodiment are a first user and a second user (which are the users III and IV respectively in the first embodiment). The electronic computing device of this embodiment comprises an input/output interface, a storage and a processor. The processor is electrically connected to the input/output interface and the storage respectively.

The first user and the second user firstly input behavior data arranged for a first period into a smart phone of the user III and a personal computer of the user IV as a first behavior data and a second behavior data respectively. Then the smart phone and the personal computer transmit the first behavior data and the second behavior data respectively to the electronic computing device.

The personalized information recommending method starts with step S400 to enable the input/output interface to receive the first behavior data of the user III and the second behavior data of the user IV. The first behavior data and the second behavior data are arranged in a first period. Then, step S410 is executed to enable the storage to store the first behavior data and the second behavior data.

Thereafter, step S420 is executed to enable the processor to retrieve the first behavior data and the second behavior data from the storage. Subsequently, step S430 is executed to enable the processor to establish a first tree structure data and a second tree structure data according to the first behavior data and the second behavior data respectively by using an ontology construction algorithm. Further speaking, the first tree structure data and the second tree structure data are established according to a general ontology tree.

Next, step S440 is executed to enable the processor to calculate a first similarity between the first tree structure data and the second tree structure data by using a similarity evaluation algorithm. Thereafter, step S450 is executed to enable the processor to analyze the first similarity to subsume the first tree structure data and the second tree structure data into a first core group by using a clustering algorithm. Then, step S460 is executed to enable the processor to determine a piece of first difference information between the first tree structure data and the second tree structure data which is the nodes comprised in the second tree structure data but not included in the first tree structure data according to the first core group.

Finally, step S470 is executed to enable the processor to generate a piece of first recommending information corresponding to the first user which is (or could be) arranged in the first period according to the piece of first difference information so that a first monitor of the first user's smart phone displays the piece of first recommending information.

In other implementations, the processor is further configured to calculate a piece of second recommending information for the second user in the same way as what is used to calculate the first recommending information, and this will not be further described herein.

In addition to the aforesaid steps, the personalized information recommending method of the fourth embodiment can also execute all the operations and functions of the electronic computing device according to the first embodiment. How the personalized information recommending method of the fourth embodiment executes these operations and functions will be readily appreciated by those of ordinary skill in the art based on the explanation of the first embodiment, and thus will not be further described herein.

A fifth embodiment of the present invention is a personalized information recommending method, a flowchart diagram of which is shown in FIG. 4. This personalized information recommending method is adapted for an electronic computing device (e.g., the electronic computing device 1 described in the second embodiment). The personalized information recommending method of this embodiment is based on the personalized information recommending method of the fourth embodiment. Differences between the fifth embodiment and the fourth embodiment will be described hereinbelow.

Specifically, the personalized information recommending method of this embodiment further executes the following operation in the step S400: enabling the input/output interface to receive a third behavior data of a third user. The third behavior data is arranged in the first period. An operation of enabling the storage to store the third behavior data is further executed in the step S410. An operation of enabling the processor to retrieve the third behavior data from the storage is further executed in the step S420.

The following operation is further executed in the step S430: enabling the processor to establish a third tree structure data according to the third behavior data by using the ontology construction algorithm. The following operation is further executed in the step S440: enabling the processor to calculate a second similarity between the first tree structure data and the third tree structure data and a third similarity between the second tree structure data and the third tree structure data by using the similarity evaluation algorithm.

The following operation is executed in the step S450: enabling the processor to analyze the first similarity, the second similarity and the third similarity to subsume the first tree structure data, the second tree structure data and the third tree structure data into the first core group by using the clustering algorithm. Furthermore, the following operation is executed in the step S460: enabling the processor to determine the piece of first difference information between the first behavior data and the second and the third behavior data which is the nodes comprised in the second and the three tree structure data but not included in the first tree structure data.

In other implementations, the first difference information comprises a plurality of difference words. The processor further accumulates a number of appearances of each of the difference words and generates the piece of first recommending information according to an optimum difference word of which the accumulated number of appearances is the largest.

In other implementations, the first recommending information can also be generated according to the first difference information by using a threshold. In detail, the threshold is an appearance ratio threshold, for example, of 0.4 of a word. For example, the data contents comprised in the second tree structure data and the third tree structure data but not comprised in the first tree structure data are a first node of the second tree structure data and a second node of the third tree structure data. The numbers of appearances of the first node and the second node are respectively 1 and 2, and thus the appearance ratios thereof are respectively 0.33 and 0.67. Then the processor generates the first recommending information according to the node of the tree structure data of which the appearance ratio is higher than the threshold of 0.4.

In other implementations, the processor is further configured to calculate a piece of second recommending information for the second user and a piece of third recommending information for the third user in the same way as what is used to calculate the piece of first recommending information, and this will not be further described herein.

In addition to the aforesaid steps, the personalized information recommending method of the fifth embodiment can also execute all the operations and functions of the electronic computing device according to the second embodiment. How the personalized information recommending method of the fifth embodiment executes these operations and functions will be readily appreciated by those of ordinary skill in the art based on the explanation of the second embodiment, and thus will not be further described herein.

Figure 5:
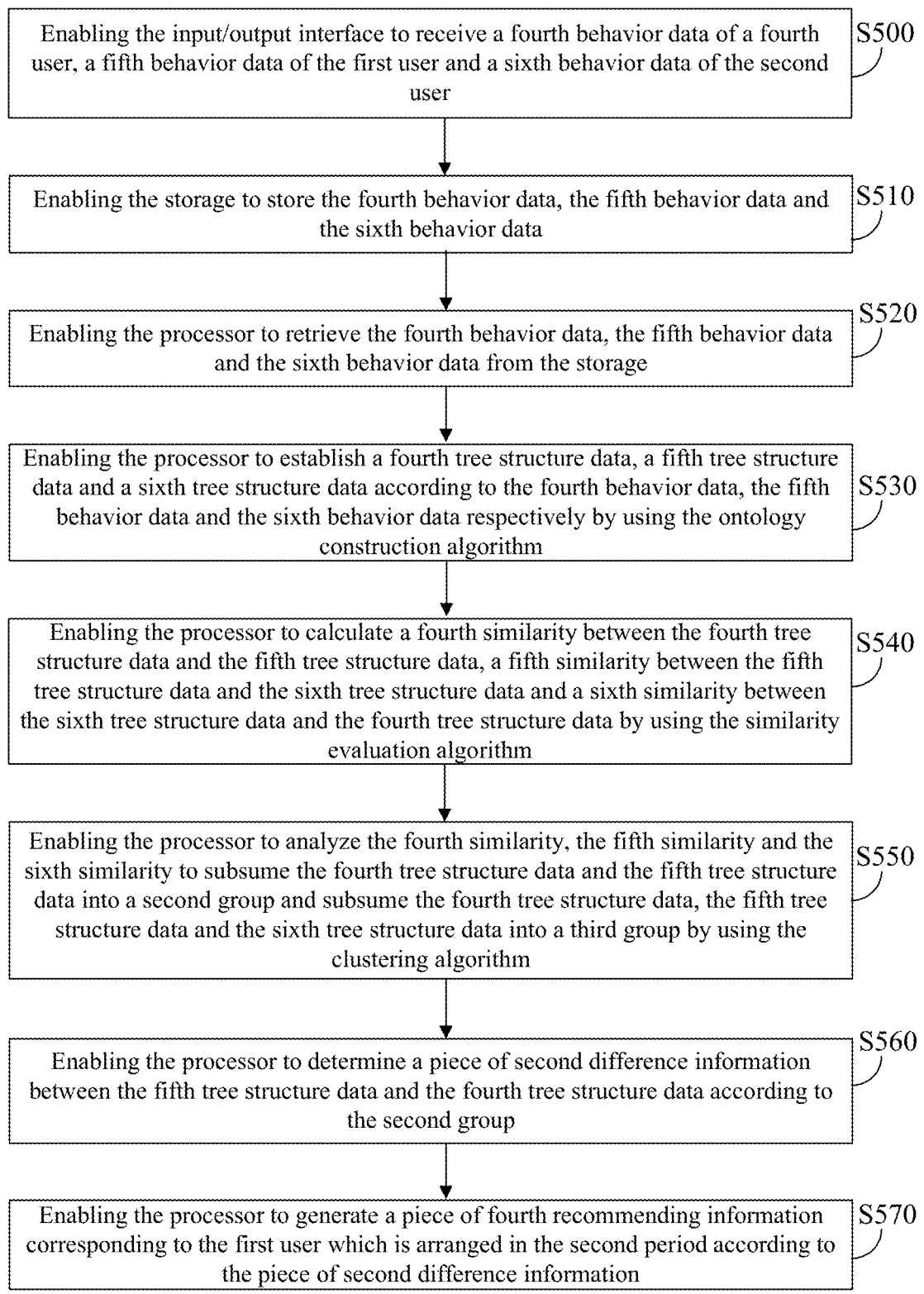
FIG. 5 is a flowchart diagram of a personalized information recommending method according to a sixth embodiment of the present invention.

A sixth embodiment of the present invention is a personalized information recommending method, a flowchart diagram of which is shown in FIG. 5. This personalized information recommending method is adapted for an electronic computing device (e.g., the electronic computing device 1 described in the third embodiment). The personalized information recommending method of this embodiment is based on the personalized information recommending method of the fourth embodiment. The sixth embodiment will be detailed hereinbelow.

The personalized information recommending method further executes step S500 to enable the input/output interface to receive a fourth behavior data of a fourth user, a fifth behavior data of the first user and a sixth behavior data of the second user. The fourth behavior data, the fifth behavior data and the sixth behavior data are arranged in a second period.

Then, step S510 is executed to enable the storage to store the fourth behavior data, the fifth behavior data and the sixth behavior data. Thereafter, step S520 is executed to enable the processor to retrieve the fourth behavior data, the fifth behavior data and the sixth behavior data from the storage. Subsequently, step S530 is executed to enable the processor to establish a fourth tree structure data, a fifth tree structure data and a sixth tree structure data according to the fourth behavior data, the fifth behavior data and the sixth behavior data respectively by using the ontology construction algorithm. Further speaking, the fourth tree structure data, the fifth tree structure data and the sixth tree structure data are established according to a general ontology tree.

Next, step S540 is executed to enable the processor to calculate a fourth similarity between the fourth tree structure data and the fifth tree structure data, a fifth similarity between the fifth tree structure data and the sixth tree structure data and a sixth similarity between the sixth tree structure data and the fourth tree structure data by using the similarity evaluation algorithm.

Thereafter, step S550 is executed to enable the processor to analyze the fourth similarity, the fifth similarity and the sixth similarity to subsume the fourth tree structure data and the fifth tree structure data into a second core group and subsume the fourth tree structure data, the fifth tree structure data and the sixth tree structure data into a third core group by using the clustering algorithm. An internal data correlation of the second core group is higher than an internal data correlation of the third core group.

Subsequently, step S560 is executed to enable the processor to determine a piece of second difference information between the fifth tree structure data and the fourth tree structure data which is the nodes comprised in the fourth tree structure data but not included in the fifth tree structure data according to the second core group. Finally, step S570 is executed to enable the processor to generate a piece of fourth recommending information corresponding to the first user which is (or could be) arranged in the second period according to the piece of second difference information. Thereafter, the processor enables the input/output interface to transmit the piece of fourth recommending information to the smart phone of the first user so that the first monitor of the smart phone displays the piece of fourth recommending information.

It should be appreciated that, the processor is further configured to calculate a piece of fifth recommending information for the fourth user and a piece of sixth recommending information for the second user in the same way as what is used to calculate the piece of fourth recommending information, and this will not be further described herein.

In addition, when there are three (or more) users, the numbers of appearances of difference words and one, two or more of the difference words having the largest number of appearances can be used as the difference information in the itinerary contents recommended to each other. Or alternatively, which difference words are used as the difference information is determined by setting a threshold, and then a piece of recommending information is provided accordingly. In this way, a piece of recommending information with redundant and messy contents resulted from too many difference words can be avoided. The implementations are as described in the fifth embodiment.

In addition to the aforesaid steps, the personalized information recommending method of the sixth embodiment can also execute all the operations and functions of the electronic computing device according to the third embodiment. How the personalized information recommending method of the sixth embodiment executes these operations and functions will be readily appreciated by those of ordinary skill in the art based on the explanation of the third embodiment, and thus will not be further described herein.

Furthermore, each of the personalized information recommending methods described in the fourth, the fifth and the sixth embodiments can be implemented by a computer program product. When the computer program product is loaded into an electronic computing device and a plurality of codes (i.e., codes A to O) comprised therein is executed, the personalized information recommending method described in the fourth, the fifth or the sixth embodiment can be accomplished. The aforesaid computer program product may be a file that can be transmitted through a network, or may be stored in a non-transitory machine-readable medium, such as a read only memory (ROM), a flash memory, a floppy disk, a hard disk, a compact disk, a mobile disk, a magnetic tape, a database accessible to networks, or any other storage media with the same function and well known to those skilled in the art.

According to the above descriptions of the embodiments, the electronic computing device of the present invention makes correlations between pieces of users' personal information accurate and further provides recommending information that varies with time to improve the effectiveness of the recommended data. Thereby, an accurate and effective recommending effect can be achieved.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An electronic computing device for providing a personalized information recommendation, comprising:
 an input/output interface, being configured to receive a first behavior data of a first user and a second behavior data of a second user, wherein the first behavior data and the second behavior data are arranged in a first period;
 a storage electrically connected to the input/output interface, being configured to store the first behavior data and the second behavior data; and
 a processor electrically connected to the storage, being configured to execute the following operations:
  retrieving the first behavior data and the second behavior data from the storage;
  establishing a first tree structure data and a second tree structure data according to the first behavior data and the second behavior data respectively by using an ontology construction algorithm;
  calculating a first similarity between the first tree structure data and the second tree structure data by using a similarity evaluation algorithm;
  analyzing the first similarity to subsume the first tree structure data and the second tree structure data into a first group by using a clustering algorithm;
  determining a piece of first difference information between the first tree structure data and the second tree structure data according to the first group; and
  generating a piece of first recommending information corresponding to the first user which is arranged in the first period according to the piece of first difference information so that a first monitor displays the piece of first recommending information.

2. The electronic computing device as claimed in claim 1, wherein the input/output interface is further configured to receive a third behavior data of a third user, the third behavior data is arranged in the first period, the storage is further configured to store the third behavior data, and the processor is further configured to execute the following operations:
 retrieving the third behavior data from the storage;
 establishing a third tree structure data according to the third behavior data by using the ontology construction algorithm;
 calculating a second similarity between the first tree structure data and the third tree structure data, and a third similarity between the second tree structure data and the third tree structure data by using the similarity evaluation algorithm; and wherein the first group further comprises the third tree structure data that is obtained by the processor by further using the clustering algorithm to analyze the first similarity, the second similarity and the third similarity;

wherein the piece of first difference information is further obtained by the processor by determining a difference between the first tree structure data and the second and the third tree structure data according to the first group.

3. The electronic computing device as claimed in claim 2, wherein the piece of first difference information comprises a plurality of difference words, and the processor further accumulates a number of appearances of each of the difference words and generates the piece of first recommending data according to an optimum difference word of which the accumulated number of appearances is the largest.

4. The electronic computing device as claimed in claim 2, wherein the piece of first difference information comprises a plurality of difference words, and the processor further generates the piece of first recommending information according to when an appearance ratio of at least one of the plurality of difference words is higher than a threshold.

5. The electronic computing device as claimed in claim 1, wherein the input/output interface is further configured to receive a fourth behavior data of a fourth user, a fifth behavior data of the first user and a sixth behavior data of the second user, the fourth behavior data, the fifth behavior data and the sixth behavior data are arranged in a second period, the storage is further configured to store the fourth behavior data, the fifth behavior data and the sixth behavior data, and the processor is further configured to execute the following operations:

retrieving the fourth behavior data, the fifth behavior data and the sixth behavior data from the storage;

establishing a fourth tree structure data, a fifth tree structure data and a sixth tree structure data according to the fourth behavior data, the fifth behavior data and the sixth behavior data respectively by using the ontology construction algorithm;

calculating a fourth similarity between the fourth tree structure data and the fifth tree structure data, a fifth similarity between the fifth tree structure data and the sixth tree structure data and a sixth similarity between the sixth tree structure data and the fourth tree structure data respectively by using the similarity evaluation algorithm;

analyzing the fourth similarity, the fifth similarity and the sixth similarity to subsume the fourth tree structure data and the fifth tree structure data into a second group and subsume the fourth tree structure data, the fifth tree structure data and the sixth tree structure data into a third group by using the clustering algorithm, wherein an internal data correlation of the second group is higher than an internal data correlation of the third group;

determining a piece of second difference information between the fifth tree structure data and the fourth tree structure data according to the second group; and generating a piece of second recommending information corresponding to the first user which is arranged in a second period according to the piece of second difference information so that the first monitor displays the piece of second recommending information.

6. A personalized information recommending method for use in an electronic computing device, the electronic computing device comprising an input/output interface, a storage and a processor, the personalized information recommending method comprising the steps of:

(a) enabling the input/output interface to receive a first behavior data of a first user and a second behavior data of a second user, wherein the first behavior data and the second behavior data are arranged in a first period;

(b) enabling the storage to store the first behavior data and the second behavior data;

(c) enabling the processor to retrieve the first behavior data and the second behavior data from the storage;

(d) enabling the processor to establish a first tree structure data and a second tree structure data according to the first behavior data and the second behavior data respectively by using an ontology construction algorithm;

(e) enabling the processor to calculate a first similarity between the first tree structure data and the second tree structure data by using a similarity evaluation algorithm;

(f) enabling the processor to analyze the first similarity to subsume the first tree structure data and the second tree structure data into a first group by using a clustering algorithm;

(g) enabling the processor to determine a piece of first difference information between the first tree structure data and the second tree structure data according to the first group; and (h) enabling the processor to generate a piece of first recommending information corresponding to the first user which is arranged in the first period according to the piece of first difference information so that a first monitor displays the piece of first recommending information.

7. The personalized information recommending method as claimed in claim 6, wherein:

the step (a) further comprises the step of:
(a1) enabling the input/output interface to receive a third behavior data of a third user, wherein the third behavior data is arranged in the first period;

the step (b) further comprises the step of:
(b1) enabling the storage to store the third behavior data;

the step (c) further comprises the step of:
(c1) enabling the processor to retrieve the third behavior data from the storage;

the step (d) further comprises the step of:
(d1) enabling the processor to establish a third tree structure data according to the third behavior data by using the ontology construction algorithm;

the step (e) further comprises the step of:
(e1) enabling the processor to calculate a second similarity between the first tree structure data and the third tree structure data and a third similarity between the second tree structure data and the third tree structure data by using the similarity evaluation algorithm;

the step (f) is further the step of:
(f1) enabling the processor to analyze the first similarity, the second similarity and the third similarity to subsume the first tree structure data, the second tree structure data and the third tree structure data into the first group by using the clustering algorithm; and the step (g) is further the step of:
(g1) enabling the processor to determine the piece of first difference information between the first tree structure data and the second and the third tree structure data.

8. The personalized information recommending method as claimed in claim 7, wherein the piece of first difference information comprises a plurality of difference words, and the processor further accumulates a number of appearances of each of the difference words and generates the piece of first recommending information according to an optimum difference word of which the accumulated number of appearances is the largest.

9. The personalized information recommending method as claimed in claim 7, wherein the piece of first difference information comprises a plurality of difference words, and the processor further generates the piece of first recommending information according to when an appearance ratio of at least one of the plurality of difference words is higher than a threshold.

10. The personalized information recommending method as claimed in claim 6, further comprising the steps of:
(i) enabling the input/output interface to receive a fourth behavior data of a fourth user, a fifth behavior data of the first user and a sixth behavior data of the second user, wherein the fourth behavior data, the fifth behavior data and the sixth behavior data are arranged in a second period;
(j) enabling the storage to store the fourth behavior data, the fifth behavior data and the sixth behavior data;
(k) enabling the processor to retrieve the fourth behavior data, the fifth behavior data and the sixth behavior data from the storage;
(l) enabling the processor to establish a fourth tree structure data, a fifth tree structure data and a sixth tree structure data according to the fourth behavior data, the fifth behavior data and the sixth behavior data respectively by using the ontology construction algorithm;
(m) enabling the processor to calculate a fourth similarity between the fourth tree structure data and the fifth tree structure data, a fifth similarity between the fifth tree structure data and the sixth tree structure data and a sixth similarity between the sixth tree structure data and the fourth tree structure data by using the similarity evaluation algorithm;
(n) enabling the processor to analyze the fourth similarity, the fifth similarity and the sixth similarity to subsume the fourth tree structure data and the fifth tree structure data into a second group and subsume the fourth tree structure data, the fifth tree structure data and the sixth tree structure data into a third group by using the clustering algorithm, wherein an internal data correlation of the second group is higher than an internal data correlation of the third group;
(o) enabling the processor to determine a piece of second difference information between the fifth tree structure data and the fourth tree structure data according to the second group; and
(p) enabling the processor to generate a piece of second recommending information corresponding to the first user which is arranged in the second period according to the piece of second difference information so that the first monitor displays the piece of second recommending information.

11. A non-transitory machine-readable medium comprising a plurality of codes, wherein when the plurality of codes are loaded into an electronic computing device, the codes comprised in the non-transitory machine-readable medium will be executed by the electronic computing device to accomplish a personalized information recommending method, the codes comprising:
a code A for enabling the electronic computing device to receive a first behavior data of a first user and a second behavior data of a second user, wherein the first behavior data and the second behavior data are arranged in a first period;
a code B for enabling the electronic computing device to store the first behavior data and the second behavior data;
a code C for enabling the electronic computing device to establish a first tree structure data and a second tree structure data according to the first behavior data and the second behavior data respectively by using an ontology construction algorithm;
a code D for enabling the electronic computing device to calculate a first similarity between the first tree structure data and the second tree structure data by using a similarity evaluation algorithm;
a code E for enabling the electronic computing device to analyze the first similarity to subsume the first tree structure data and the second tree structure data into a first group by using a clustering algorithm;
a code F for enabling the electronic computing device to determine a piece of first difference information between the first tree structure data and the second tree structure data according to the first group; and
a code G for enabling the electronic computing device to generate a piece of first recommending information corresponding to the first user which is arranged in the first period according to the piece of first difference information so that a first monitor displays the piece of first recommending information.

12. The non-transitory machine-readable medium as claimed in claim 11, wherein:
the code A further comprises a code for:
enabling the electronic computing device to receive a third behavior data of a third user, wherein the third behavior data is arranged in the first period;
the code B further comprises a code for:
enabling the electronic computing device to store the third behavior data;
the code C further comprises a code for:
enabling the electronic computing device to establish a third tree structure data according to the third behavior data by using the ontology construction algorithm;
the code D further comprises a code for:
enabling the electronic computing device to calculate a second similarity between the first tree structure data and the third tree structure data and a third similarity between the second tree structure data and the third tree structure data by using the similarity evaluation algorithm;
the code E is further a code for:
enabling the electronic computing device to analyze the first similarity, the second similarity and the third similarity to subsume the first tree structure data, the second tree structure data and the third tree structure data into the first group by using the clustering algorithm; and
the code F is further a code for:
enabling the electronic computing device to determine the piece of first difference information between the first tree structure data and the second and the third tree structure data.

13. The non-transitory machine-readable medium as claimed in claim 12, wherein the piece of first difference information comprises a plurality of difference words, and the codes further comprising: a code, enabling the electronic computing device to accumulate a number of appearances of each of the difference words and generates the piece of first recommending information according to an optimum difference word of which the accumulated number of appearance is the largest.

14. The non-transitory machine-readable medium as claimed in claim 12, wherein the piece of first difference information comprises a plurality of difference words, and the codes further comprising: a code, enabling the electronic computing device to generate the piece of first recommending information when an appearance ratio of at least one of the plurality of difference words is higher than a threshold.

15. The non-transitory machine-readable medium as claimed in claim 11, wherein the codes further comprises:
- a code H for enabling the electronic computing device to receive a fourth behavior data of a fourth user, a fifth behavior data of the first user and a sixth behavior data of the second user, wherein the fourth behavior data, the fifth behavior data and the sixth behavior data are arranged in a second period;
- a code I for enabling the electronic computing device to store the fourth behavior data, the fifth behavior data and the sixth behavior data;
- a code J for enabling the electronic computing device to establish a fourth tree structure data, a fifth tree structure data and a sixth tree structure data according to the fourth behavior data, the fifth behavior data and the sixth behavior data respectively by using the ontology construction algorithm;
- a code K for enabling the electronic computing device to calculate a fourth similarity between the fourth tree structure data and the fifth tree structure data, a fifth similarity between the fifth tree structure data and the sixth tree structure data and a sixth similarity between the sixth tree structure data and the fourth tree structure data respectively by using the similarity evaluation algorithm;
- a code L for enabling the electronic computing device to analyze the fourth similarity, the fifth similarity and the sixth similarity to subsume the fourth tree structure data and the fifth tree structure data into a second group and subsume the fourth tree structure data, the fifth tree structure data and the sixth tree structure data into a third group by using the clustering algorithm, wherein an internal data correlation of the second group is higher than an internal data correlation of the third group;
- a code M for enabling the electronic computing device to determine a piece of second difference information between the fifth tree structure data and the fourth tree structure data according to the second group; and
- a code O for enabling the electronic computing device to generate a piece of second recommending information corresponding to the first user which is arranged in a second period according to the piece of second difference information so that the first monitor displays the piece of second recommending information.

* * * * *